United States Patent
Hosoda et al.

(10) Patent No.: US 8,722,843 B2
(45) Date of Patent: May 13, 2014

(54) MATERIAL FOR FIBER MANUFACTURING AND FIBER

(71) Applicant: Sumitomo Chemical Company, Limited, Tokyo (JP)

(72) Inventors: Tomoya Hosoda, Tsukuba (JP); Mitsuo Maeda, Tsukuba (JP); Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/680,574

(22) Filed: Nov. 19, 2012

(65) Prior Publication Data

US 2013/0131304 A1     May 23, 2013

(30) Foreign Application Priority Data

Nov. 21, 2011    (JP) ................. 2011-253883

(51) Int. Cl.
*C08G 63/02*     (2006.01)
*C08G 64/00*     (2006.01)

(52) U.S. Cl.
USPC ............ 528/194; 528/176; 528/190; 528/193

(58) Field of Classification Search
USPC ................... 528/176, 190, 193, 194
See application file for complete search history.

(56) References Cited

U.S. PATENT DOCUMENTS

| 4,181,792 | A | 1/1980 | Jackson, Jr. et al. |
| 2006/0141275 | A1 | 6/2006 | Yamashita et al. |
| 2010/0041855 | A1 | 2/2010 | Hosoda et al. |
| 2011/0068302 | A1 | 3/2011 | Yamashita et al. |

FOREIGN PATENT DOCUMENTS

| JP | 2004-019021 A | 1/2004 |
| JP | 2010-043380 A | 2/2010 |

OTHER PUBLICATIONS

Naoyuki Koide (ed.), "Liquid Crystalline Polymer—Synthesis, Molding, Applications—", CMC, Jun. 5, 1987, pp. 95-105.
Office Action issued Jun. 28, 2013 in U.S. Appl. No. 13/680,473.
U.S. Appl. No. 13/680,473 by Hosoda, filed Nov. 19, 2012.

*Primary Examiner* — Terressa Boykin
(74) *Attorney, Agent, or Firm* — Panitch Schwarze Belisario & Nadel LLP

(57) ABSTRACT

Disclosed is a material for fiber manufacturing comprising a liquid crystal polyester satisfying the following requirements (a) and (b):
(a) the weight-average molecular weight is equal to or less than 30000 and the polydispersity is equal to or less than 2.5; and
(b) the melt viscosity measured at 360° C. with conditions of a nozzle pore diameter of 0.5 mm and a shear velocity of 1000 $s^{-1}$ using a flow feature testing machine is equal to or less than 70 Pa·s.

9 Claims, No Drawings

MATERIAL FOR FIBER MANUFACTURING AND FIBER

BACKGROUND OF THE INVENTION

1. Field of the Invention

The present invention relates to a material for fiber manufacturing and a fiber. Priority is claimed on Japanese Patent Application No. 2011-253883, filed on Nov. 21, 2011, the content of which is incorporated herein by reference.

2. Description of Related Art

Liquid crystal polyester is widely used as a material for electronic parts and the like for having excellent low moisture absorption, heat resistance, thin formability, and the like. In recent years, by making use of such characteristics of liquid crystal polyester, fiber forming liquid crystal polyester has been considered.

In a case where liquid crystal polyester is fiber formed, generally, the liquid crystal polyester is melted before being extruded through pores and stretched. At this time, the lower the viscosity of the liquid crystal polyester in a melted state, the finer the fiber that can be obtained, and the more favorable the fiber formation.

Liquid crystal polyester of the related art could greatly increase in viscosity when in a melted state for a long time. However, in recent years, liquid crystal polyester that can reliably suppress an increase in the viscosity even in a melted state and that allows easy fiber formation while maintaining the characteristics has been proposed (Japanese Unexamined Patent Application, First Publication No. 2010-43380).

SUMMARY OF THE INVENTION

Although fiber formed using a liquid crystal polyester known in the related art could have high strength, there was need for further strengthening, leaving room for improvement.

The present invention has been conceived in view of such circumstances, and an object thereof is to provide a material for fiber manufacturing which can improve the fiber strength. Further, another object thereof is to provide a fiber with high fiber strength by using such a material.

In order to solve the problem described above, a material for fiber manufacturing comprising a liquid crystal polyester satisfying the following requirements (a) and (b) is provided.
(a) the weight-average molecular weight is equal to or less than 30000 and the polydispersity is equal to or less than 2.5; and
(b) the melt viscosity measured at 360° C. with conditions of a nozzle pore diameter of 0.5 mm and a shear velocity of 1000 s$^{-1}$ using a flow feature testing machine is equal to or less than 70 Pa·s.

In the present invention, it is desirable that the liquid crystal polyester comprise the repeating units represented by the following Formulae (1), (2), and (3):

 (1)

 (2)

 (3)

wherein Ar$^1$ represents a phenylene group, a naphthylene group, or a biphenylylene group; Ar$^2$ and Ar$^3$ each independently represent a phenylene group, a naphthylene group, a biphenylylene group, or a group represented by the following Formula (4); X and Y each independently represent an oxygen atom or an imino group (—NH—); and hydrogen atoms in the group represented by Ar$^1$, Ar$^2$, or Ar$^3$ may each be independently substituted by a halogen atom, an alkyl group with 1 to 10 carbon atoms, or an aryl group with 6 to 20 carbon atoms;

 (4)

wherein Ar$^4$ and Ar$^5$ each independently represent a phenylene group or a naphthylene group; Z represents an oxygen atom, a sulfur atom, a carbonyl group, a sulfonyl group, or an alkylidene group.

In the present invention, it is desirable that the liquid crystal polyester comprise a repeating unit represented by Formula (1) in which Ar$^1$ is a 1,4-phenylene group, a repeating unit represented by Formula (2) in which Ar$^2$ is a 1,4-phenylene group or a 1,3-phenylene group, and a repeating unit represented by Formula (3) in which Ar$^3$ is a 4,4'-biphenylylene group.

In the present invention, it is desirable that the liquid crystal polyester have a content amount of a repeating unit comprising a 2,6-naphthylene group of equal to or greater than 40 mol % with respect to the total content amount of all repeating units.

Further, the fiber of the present invention is obtained by spinning the material for fiber manufacturing described above.

That is, the present invention relates to the following.
[1] A material for fiber manufacturing comprising a liquid crystal polyester satisfying the following requirements (a) and (b):
(a) the weight-average molecular weight is equal to or less than 30000 and the polydispersity is equal to or less than 2.5; and
(b) the melt viscosity measured at 360° C. with conditions of a nozzle pore diameter of 0.5 mm and a shear velocity of 1000 s$^{-1}$ using a flow feature testing machine is equal to or less than 70 Pa·s.
[2] The material for fiber manufacturing according to [1], wherein the liquid crystal polyester comprises the repeating units represented by the following Formulae (1), (2), and (3):

 (1)

 (2)

 (3)

wherein Ar$^1$ represents a phenylene group, a naphthylene group, or a biphenylylene group: Ar$^2$ and Ar$^3$ each independently represent a phenylene group, a naphthylene group, a biphenylylene group, or a group represented by the following Formula (4); X and Y each independently represent an oxygen atom or an imino group (—NH—); and hydrogen atoms in the group represented by Ar$^1$, Ar$^2$, or Ar$^3$ may each be independently substituted by a halogen atom, an alkyl group with 1 to 10 carbon atoms, or an aryl group with 6 to 20 carbon atoms;

 (4)

wherein Ar$^4$ and Ar$^y$ each independently represent a phenylene group or a naphthylene group; Z represents an oxygen atom, a sulfur atom, a carbonyl group, a sulfonyl group, or an alkylidene group.
[3] The material for fiber manufacturing according to [2], wherein the liquid crystal polyester comprises a repeating unit represented by Formula (1) in which Ar$^1$ is a 1,4-phenylene group, a repeating unit represented by Formula (2) in which Ar$^2$ is a 1,4-phenylene group or a 1,3-phenylene group, and a repeating unit represented by Formula (3) in which Ar$^3$ is a 4,4'-biphenylylene group.

[4] The material for fiber manufacturing according to [2] or [3], wherein the liquid crystal polyester has a content amount of a repeating unit comprising a 2,6-naphthylene group of equal to or greater than 40 mol % with respect to the total content amount of all repeating units.

[5] A fiber obtained by spinning a material for fiber manufacturing according to any one of [1] to [4].

According to the present invention, a material for fiber manufacturing which can improve the fiber strength can be provided. Further, by using such a material, a fiber with high fiber strength can be provided.

DETAILED DESCRIPTION OF THE INVENTION

The material for fiber manufacturing of the present embodiment is comprising a liquid crystal polyester satisfying the following requirements (a) and (b).
(a) weight-average molecular weight is equal to or less than 30000 and the polydispersity is equal to or less than 2.5.
(b) the melt viscosity measured at 360° C. with conditions of a nozzle pore diameter of 0.5 mm and a shear velocity of 1000 s$^{-1}$ using a flow feature testing machine is equal to or less than 70 Pa·s.

Further, the fiber of the present embodiment is obtained by spinning the material for fiber manufacturing described above.

Details of the present invention will be described below.
Liquid Crystal Polyester The liquid crystal polyester used in the material for fiber manufacturing of the present embodiment preferably exhibits liquid crystallinity in a melted state and melts at a temperature equal to or less than 450° C. Here, the liquid crystal polyester may be a liquid crystal polyester amide, a liquid crystal polyester ether, a liquid crystal polyester carbonate, or a liquid crystal polyester imide. The liquid crystal polyester is preferably a wholly aromatic liquid crystal polyester formed using only an aromatic compound as the raw material monomer.

Typical examples of the liquid crystal polyester include:
(I) A liquid crystal polyester in which at least one type of compound selected from a group including an aromatic diol, an aromatic hydroxy amine, and an aromatic diamine, an aromatic hydroxy carboxylic acid, and an aromatic dicarboxylic acid are polymerized (polycondensated);
(II) A liquid crystal polyester in which a plurality of types of aromatic hydroxy carboxylic acids are polymerized;
(III) A liquid crystal polyester in which at least one type of compound selected from a group including an aromatic diol, an aromatic hydroxy amine, and an aromatic diamine, and an aromatic dicarboxylic acid are polymerized; and
(IV) A liquid crystal polyester in which a polyester such as polyethylene terephthalate and an aromatic hydrocarboxylic acid are polymerized.

An aromatic hydroxy carboxylic acid is a compound in which two hydrogen atoms bonded to an aromatic compound are each substituted from the aromatic compound by a hydroxyl group and a carboxyl group.

An aromatic dicarboxylic acid is a compound in which two hydrogen atoms bonded to an aromatic compound are each substituted from the aromatic compound by a carboxyl group.

An aromatic diol is a compound in which two hydrogen atoms bonded to an aromatic compound are each substituted from the aromatic compound by a hydroxyl group.

An aromatic hydroxyamine is a compound in which two hydrogen atoms bonded to an aromatic compound are each substituted from the aromatic compound by a hydroxyl group and an amino group.

An aromatic diamine is a compound in which two hydrogen atoms bonded to an aromatic compound are each substituted from the aromatic compound by an amino group.

Examples of aromatic compounds include benzene, naphthalene, biphenyl, and the like.

Here, for the aromatic hydroxy carboxylic acid, the aromatic dicarboxylic acid, the aromatic diol, the aromatic hydroxyamine, and the aromatic diamine, a polymerizable derivative may each be used independently instead of a portion or the entirety thereof.

Examples of polymerizable derivatives of a compound including a carboxylic group such as an aromatic hydroxy carboxylic acid or an aromatic dicarboxylic acid include an ester in which the carboxylic group is converted into an alkoxycarbonyl group or an aryloxycarbonyl group, an acid halide in which the carboxyl group is converted into a haloformyl group, and an acid anhydride in which the carboxyl group is converted into an acyl oxycarbonyl group.

Examples of polymerizable derivatives of a compound including a hydroxyl group such as an aromatic hydroxy carboxylic acid, an aromatic diol, and an aromatic hydroxyamine include an acyl compound in which the hydroxyl group is acylated and converted into an acyloxy group.

Examples of polymerizable derivatives of a compound including an amino group such as an aromatic hydroxyamine and an aromatic diamine include an acyl compound in which the amino group is acylated and converted into an acylamino group.

The liquid crystal polyester preferably comprises the repeating unit represented by the following Formula (1) (hereinafter may be referred to as "Repeating Unit (1)"), and more preferably comprises Repeating Unit (1), the repeating unit represented by the following Formula (2) (hereinafter may be referred to as "Repeating Unit (2)"), and the repeating unit represented by the following Formula (3) (hereinafter may be referred to as "Repeating Unit (3)"):

—O—Ar$^1$—CO— (1)

—CO—Ar$^2$—CO— and (2)

—X—Ar$^3$—Y— (3)

wherein Ar$^1$ represents a phenylene group, a naphthylene group, or a biphenylylene group; Ar$^2$ and Ar$^3$ each independently represent a phenylene group, a naphthylene group, a biphenylylene group, or a group represented by the following Formula (4); X and Y each independently represent an oxygen atom or an imino group (—NH—); and hydrogen atoms in the group represented by Ar$^1$, Ar$^2$, or Ar$^3$ may each be independently substituted by a halogen atom, an alkyl group with 1 to 10 carbon atoms, or an aryl group with 6 to 20 carbon atoms;

—Ar$^4$—Z—Ar$^5$ (4)

wherein Ar$^4$ and Ar$^5$ each independently represent a phenylene group or a naphthylene group; and Z represents an oxygen atom, a sulfur atom, a carbonyl group, a sulfonyl group, or an alkylidene group.

Examples of the halogen atom include a fluorine atom, a chlorine atom, a bromine atom, and an iodine atom.

Examples of the alkyl group preferably have 1 to 10 carbon atoms, and include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group.

Examples of the aryl group preferably have 6 to 20 carbon atoms, and include a phenyl group, an o-tolyl group, an m-tolyl group, a p-tolyl group, a 1-naphthyl group, and a 2-naphthyl group.

In a case where the hydrogen atoms in the groups described above represented by $Ar^1$, $Ar^2$, or $Ar^3$ are substituted by such groups, the number thereof for each of the groups described above represented by $Ar^1$, $Ar^2$, or $Ar^3$ each is independently two or fewer and preferably one or fewer.

Examples of the alkylidene group described above preferably have 1 to 10 carbon atoms, and include a methylene group, an ethylidene group, an isopropylidene group, an n-butylidene group, and a 2-ethyl hexylidene group.

Repeating Unit (1) is a repeating unit derived from a predetermined aromatic hydroxy carboxylic acid. Repeating Unit (1) in which $Ar^1$ is a p-phenylene group (a repeating unit derived from a p-hydroxy benzoic acid) and Repeating Unit (1) in which $Ar^1$ is a 2,6-naphthylene group (a repeating unit derived from a 6-hydroxy-2-naphthoic acid) are preferable.

Repeating Unit (2) is a repeating unit derived from a predetermined aromatic dicarboxylic acid. Repeating Unit (2) in which $Ar^2$ is a p-phenylene group (a repeating unit derived from a terephthalic acid), Repeating Unit (2) in which $Ar^2$ is an m-phenylene group (a repeating unit derived from an isophthalic acid), Repeating Unit (2) in which $Ar^2$ is a 2,6-naphthylene group (a repeating unit derived from a 2,6-naphthalene dicarboxylic acid), and Repeating Unit (2) in which $Ar^2$ is a diphenyl ether-4,4'-diyl group (a repeating unit derived from a diphenyl ether-4,4'-dicarboxylic acid) are preferable.

Repeating Unit (3) is a repeating unit derived from a predetermined aromatic diol, aromatic hydroxylamine, or aromatic diamine. Repeating Unit (3) in which $Ar^3$ is a p-phenylene group (a repeating unit derived from a hydroquinone, a p-aminophenol, or a p-phenylenediamine) and Repeating Unit (3) in which $Ar^3$ is a 4,4'-biphenylylene group (a repeating unit derived from a 4,4'-dihydroxy biphenyl, a 4-amino-4'-hydroxy biphenyl, or a 4,4'-diaminobiphenyl) are preferable.

The content amount of Repeating Unit (1) with respect to the total amount of all repeating units (a sum value of the substance equivalent amount (mol) of each repeating unit found by dividing the mass of each repeating unit configuring the liquid crystal polyester by the formula weight of each repeating unit) is normally equal to or greater than 30 mol %, preferably equal to or greater than 30 mol % and equal to or less than 80 mol %, more preferably equal to or greater than 40 mol % and equal to or less than 70 mol %, and still more preferably equal to or greater than 45 mol % and equal to or less than 65 mol %.

The content amount of Repeating Unit (2) with respect to the total amount of all repeating units is normally equal to or less than 35 mol %, preferably equal to or greater than 10 mol % and equal to or less than 35 mol %, more preferably equal to or greater than 15 mol % and equal to or less than 30 mol %, and still more preferably equal to or greater than 17.5 mol % and equal to or less than 27.5 mol %.

The content amount of Repeating Unit (3) with respect to the total amount of all repeating units is normally equal to or less than 35 mol %, preferably equal to or greater than 10 mol % and equal to or less than 35 mol %, more preferably equal to or greater than 15 mol % and equal to or less than 30 mol %, and still more preferably equal to or greater than 17.5 mol % and equal to or less than 27.5 mol %.

A liquid crystal polyester having such a predetermined repeating unit composition has excellent heat resistance, formability, and balance. While the greater the content amount of Repeating Unit (1), the more easily the melt fluidity, the heat resistance, and strength and hardness improve, if the content amount is too high, the melting temperature and the melting viscosity tend to increase, and the temperature required for formation tends to increase.

Here, the content amount of Repeating Unit (2) and the content amount of Repeating Unit (3) are essentially preferably the same. The ratio between the content amount of Repeating Unit (2) and the content amount of Repeating Unit (3) is represented by [content amount of Repeating Unit (2)/[content amount of Repeating Unit (3)] (mol/mol), and is normally 0.9/1 to 1/0.9, preferably 0.95/1 to 1/0.95, and more preferably 0.98/1 to 1/0.98.

Here, the liquid crystal polyester may comprise two or more types of Repeating Units (1) to (3), each independently. Further, while the liquid crystal polyester may comprise a repeating unit other than Repeating Units (1) to (3), the content amount thereof with respect to the total amount of all repeating units is normally equal to or less than 10 mol % and preferably equal to or less than 5 mol %.

The liquid crystal polyester preferably comprises Repeating Unit (3) in which X and Y are each independently oxygen atoms (comprises a repeating unit derived from a predetermined aromatic diol) so that the melting viscosity is decreased, and more preferably comprises Repeating Unit (3) in which X and Y are each only oxygen atoms.

Further, if the required constituent components of the liquid crystal polyester have $Ar^1$ of Repeating Unit (1) comprising a 1,4-phenylene group, $Ar^2$ of Repeating Unit (2) comprising either one of a 1,4-phenylene group and a 1,3-phenylene group, and $Ar^3$ of Repeating Unit (3) comprising a 4,4'-biphenylylene group, the strength and elasticity of the obtained fiber is excellent.

Furthermore, if the liquid crystal polyester has a content amount of equal to or greater than 40 mol % of a repeating unit comprising a 2,6-naphthylene group with respect to the total content amount of all repeating units, the obtained fiber has excellent electrical properties (low dielectric loss tangent).

In such a case, Repeating Unit (1) in which $Ar^1$ is a 2,6-naphthylene group (a repeating unit derived from a 6-hydroxy-2-naphthoic acid) is preferable as the obtained fiber has excellent electrical properties (low dielectric loss tangent).

Further, Repeating Unit (2) in which $Ar^2$ is a 2,6-naphthylene group (a repeating unit derived from a 2,6-nathalene dicarboxylic acid) and Repeating Unit (2) in which $Ar^2$ is a 1,4-phenylene group (a repeating unit derived from a terephthalic acid) are preferable as the obtained fiber has excellent electrical properties (low dielectric loss tangent).

Further, Repeating Unit (3) in which $Ar^3$ is a 1,4-phenylene group (a repeating unit derived from a hydroquinone) and Repeating Unit (3) in which $Ar^3$ is a 4,4-biphenylylene group (a repeating unit derived from a 4,4'-dihydroxybiphenyl) are preferable as the obtained fiber has excellent electrical properties (low dielectric loss tangent).

A typical example of a liquid crystal polyester with high heat resistance and melt tension
(i) preferably includes equal to or greater than 40 mol % and equal to or less than 74.8 mol % of Repeating Unit (1) in which $Ar^1$ is a 2,6-naphthylene group, that is, a repeating unit derived from a 6-hydroxy-2-naphthoic acid, with respect to the total amount of all repeating units, more preferably includes equal to or greater than 40 mol % and equal to or less than 64.5 mol %, and still more preferably includes equal to or greater than 50 mol % and equal to or less than 58 mol %,
(ii) preferably includes equal to or greater than 12.5 mol % and equal to or less than 30 mol % of Repeating Unit (2) in which Ar² is a 2,6-naphthylene group, that is, a repeating unit derived from a 2,6-nathalene dicarboxylic acid, with respect to the total amount of all repeating units, more preferably includes equal to or greater than 17.5 mol % and equal to or less than 30 mol %, and still more preferably includes equal to or greater than 20 mol % and equal to or less than 25 mol %,
(iii) preferably includes equal to or greater than 0.2 mol % and equal to or less than 15 mol % of Repeating Unit (2) in which Ar² is a 1,4-phenylene group, that is, a repeating unit derived from a terephthalic acid, with respect to the total amount of all repeating units, more preferably includes equal to or greater than 0.5 mol % and equal to or less than 12 mol %, and still more preferably includes equal to or greater than 2 mol % and equal to or less than 10 mol %,
(iv) preferably includes equal to or greater than 12.5 mol % and equal to or less than 30 mol % of Repeating Unit (3) in which Ar³ is a 1,4-phenylene group, that is, a repeating unit derived from a hydroquinone, with respect to the total amount of all repeating units, more preferably includes equal to or greater than 17.5 mol % and equal to or less than 30 mol %, and still more preferably includes equal to or greater than 20 mol % and equal to or less than 25 mol %, and
(v) in the total amount of all repeating units, the content of Repeating Unit (2) in which Ar² is a 2,6-naphthylene group with respect to the total content amount of Repeating Unit (2) in which Ar² is a 2,6-naphthylene group and Repeating Unit (2) in which Ar² is a 1,4-phenylene group is preferably equal to or greater than 0.5 mol-fold and more preferably equal to or greater than 0.6 mol-fold.

The liquid crystal polyester can be manufactured by polymerizing (polycondensating) so that the total amount of monomers comprising a 2,6 naphthylene group (the total amount of a 6-hydroxy-2-naphthoic acid, a 2,6-naphthalene dicarboxylic acid, and a 2,6-naphthalene diol) is equal to or greater than 40 mol % with respect to the total amount of all monomers.

The liquid crystal polyester is preferably manufactured by melt polymerizing the raw material monomers corresponding to the repeating units configuring the liquid crystal polyester and solid-state polymerizing the obtained polymer (hereinafter may be referred to as the "prepolymer"). In so doing, a high molecular weight liquid crystal polyester with high heat resistance and strength and hardness can be manufactured to have good operability. The melt polymerization may be performed with the presence of a catalyst, and examples of the catalyst include metallic compounds such as magnesium acetate, stannous acetate, tetrabutyl titanate, lead acetate, sodium acetate, potassium acetate, and antimony trioxide and nitrogen-containing heterocyclic compounds such as 4-(dimethylamino)pyridine and 1-methyl-imidazole, and a nitrogen-containing heterocyclic compound is preferably used.

The liquid crystal polyester described above used as the raw material of the material for fiber manufacturing normally has a flow starting temperature of equal to or greater than 280° C., preferably equal to or greater than 280° C. and equal to or less than 400° C., and more preferably equal to or greater than 280° C. and equal to or less than 360° C. While the higher the flow starting temperature, the more easily heat resistance and strength and hardness improve, if the flow starting temperature is too high, the melting temperature and the melt viscosity tend to increase, making fiber formation difficult.

Here, the flow starting temperature is also referred to as the flow temperature, which is the temperature indicating a viscosity of 4800 Pa·s (48000 poises) when the liquid crystal polyester is melted by being heated at a speed of 4° C./minute under a load of 9.8 MPa (100 kg/cm²) using a capillary rheometer and extruded from a nozzle with an inner diameter of 1 mm and a length of 10 mm, and is an indication of the molecular weight of the liquid crystal polyester (refer to Naoyuki Koide (ed.), "Liquid Crystalline Polymer—Synthesis, Molding, Applications—", CMC, Jun. 5, 1987, p. 95).

Further, the liquid crystal polyester has a weight-average molecular weight of equal to or less than 30000 and a polydispersity of equal to or less than 2.5. Preferably, the weight-average molecular weight is equal to or less than 28000 and the polydispersity is equal to or less than 2.4. More preferably, the weight-average molecular weight is equal to or less than 28000 and the polydispersity is equal to or less than 2.2.

A value calculated as below was used as the weight-average molecular weight in the present specification.

First, a representative sample of the liquid crystal polyester was measured using a GPC-MALS method, the molecular weight at each elution time was found from the obtained MALS signal using the following Equation (1), and the absolute weight-average molecular weight of the representative sample was found using Equation (2). Here, since the second item on the right side of Equation (1) is small compared to the first item on the right side, calculation was performed with the second item on the right side of Equation (1) abstracted.

Equation (1):

$$\frac{K \cdot c_i}{R_{\theta i}} = \frac{1}{M_i} + 2A_2 \cdot c_i \qquad (1)$$

Equation (2):

$$M_w = \frac{\sum c_i M_i}{\sum c_i} \qquad (2)$$

$M_w$: absolute weight-average molecular weight, molecular weight of the sample at each elution time, K: MALS constant=device constant×(refractive index of solvent)²× (change in refractive index concentration)², $R_{\theta i}$: excess Rayleigh ratio at each elution time, $A_2$: second virial coefficient, sample concentration at each elution time.

For the change in refractive index concentration (dn/dc) used to calculate the K of Equation (1) described above, the dn/dc value of the polystyrene was calculated from the GPC-MALS curve of a polystyrene with a known molecular weight, and the dn/dc value of a sample of a liquid crystal polyester was calculated using the following Equation (3).

Equation(3):

$$dn/dc(\text{sample}) = dn/dc(\text{polystyrene}) \times A_{SAM}/A_{STD} \qquad (3)$$

$A_{STD}$: peak area shown by a unit area of polystyrene, $A_{SAM}$: peak area shown by a unit amount of sample Next, the molecular weight calibration curve was calculated by approximating the relationship between a logarithm of the molecular weight of a standard polystyrene and the elution time of GPC measurement using the following Equation (4), and the molecular weight calibration curve was further adjusted so that the weight-average molecular weight of the sample matches the absolute weight-average molecular weight described above.

Equation(4):

$$\text{Log}\, M = A_0 + A_1 \cdot t + A_2 \cdot t^2 + A_3 \cdot t^3 \qquad (4)$$

M: molecular weight, t: elution time, $A_i$: coefficient

By performing data processing using the molecular weight calibration curve and calculated in such a manner and the GPC curve of the liquid crystal polyester, a numerical average molecular weight $M_n$ was calculated.

Further, the numerical average molecular weight $M_n$ was calculated using the same method as the method described above, and the polydispersity was calculated as Mw/Mn.

While the liquid crystal polyester as the material for fiber manufacturing can be created by performing an adjustment so that the weight-average molecular weight thereof is equal to or less than 30000 through a polymerization reaction, for example, further sorting the liquid crystal polyester by screening so that the median diameter (×50) is equal to or greater than 250 μm and equal to or less than 600 μm, and the like, the invention is not limited thereto.

Further, the liquid crystal polyester has a melt viscosity measured in conditions of a nozzle pore diameter of 0.5 mm and a shear velocity of 1000 s$^{-1}$ using a flow feature testing machine at 360° C. of equal to or less than 70 Pa·s. If the melt viscosity is greater than 70 Pa·s, the strength of the obtained fiber tends to decrease, and it tends to be difficult to reduce the low molecular weight components.

The liquid crystal polyester preferably has a melt viscosity of equal to or less than 40 Pa·s with the conditions described above at 360° C., and more preferably has a melt viscosity of equal to or less than 20 Pa·s with the conditions described above at 360° C.

When the long-term heat stability of the liquid crystal polyester in the fiber formation is considered, the liquid crystal polyester preferably has a temperature at which the melt viscosity is equal to or less than 70 Pa·s measured with the conditions described above of 340° C., more preferably a temperature at which the melt viscosity is equal to or less than 40 Pa·s measured with the conditions described above of 340° C., and still more preferably a temperature at which the melt viscosity is equal to or less than 20 Pa·s measured with the conditions described above of 340° C.

Here, with the melt viscosity described above, there is substantially no difference between a value measured for a powder of the liquid crystal polyester described above as the raw material of the material for fiber manufacturing and a value measure for the material for fiber manufacturing which is in pellet form through melt kneading using an extruder as described later. Therefore, the material for fiber manufacturing in pellet form with which measuring is convenient may be measured.

Material for Fiber Manufacturing

The material for fiber manufacturing of the present embodiment can be prepared by melt kneading the liquid crystal polyester described above using an extruder. After melt kneading, the liquid crystal polyester is preferably formed in a pellet form.

An extruder including a cylinder, one or more screws arranged within the cylinder, and a supply opening at one or more locations provided on the cylinder is preferably used. Furthermore, an extrude including a vent portion at one or more locations provided on the cylinder is more preferable. Further, an extruder including a kneading portion on the downstream side of the supply opening (each on the downstream side of each supply opening in a case where a plurality of supply openings are provided) is preferably used. Here, a kneading portion refers to a portion provided on a portion of a screw for efficiently performing melt kneading. Examples of the kneading portion include kneading discs (right kneading disc, neutral kneading disc, right kneading disc), a mixing screw, and the like.

The material for fiber manufacturing of the present embodiment is obtained by removing remaining low molecular weight components from the melt kneading liquid crystal polyester and reducing the content amount by connecting a decompression device at locations with the vent portion at one or more locations provided on the cylinder and degassing within the cylinder using the decompression device during melt kneading.

The obtained material for fiber manufacturing has a melt viscosity measured in conditions of a nozzle pore diameter of 0.5 mm and a shear velocity of 1000 s$^{-1}$ using a flow feature testing machine at 360° C. of equal to or less than 70 Pa·s. If the melt viscosity measured with the conditions described above at 360° C. is greater than 70 Pa·s, the low molecular weight compounds tend not to decrease.

Fiber and Fiber Cloth Comprising Liquid Crystal Polyester

Next, the fiber obtained by spinning the material for fiber manufacturing of the embodiment described above and a fiber cloth (bonded textile or the like) using the fiber will be described.

The fiber of the present embodiment is obtained by spinning the material for fiber manufacturing described above. The fiber can be obtained by fiber forming the material for fiber manufacturing using a known method, and for example, can be obtained by melt spinning the material for fiber manufacturing.

In a case where the material for fiber manufacturing is fiber formed through melt spinning, the material for fiber manufacturing is heated to a melted state, and by extruding the material for fiber manufacturing in the melted state through a predetermined nozzle and then cooling while stretching the material for fiber manufacturing to solidify the material for fiber manufacturing once again, a fiber in which the material for fiber manufacturing has been thinned can be obtained.

At this time, while a liquid crystal polyester fiber is obtained if the material for fiber manufacturing which is stretched by the melt spinning is wound as is or the like, a fiber cloth (bonded textile) comprising a liquid crystal polyester fiber can be obtained if the material for fiber manufacturing is deposited on a predetermined substrate or the like while moving a nozzle or the like before the material for fiber manufacturing completely solidifies.

Since such a liquid crystal polyester fiber can be obtained by spinning the material for fiber manufacturing of the present embodiment described above, the liquid crystal polyester fiber can have a small dielectric loss and high heat resistance. Further, since the liquid crystal polyester that is the raw material of the material for fiber manufacturing has high heat stability in which the decrease in viscosity is small even in a melted state for an extended amount of time, since the fiber formation by the melt spinning described above is easy and a low viscosity can be maintained, the formation of fine fibers is also possible.

Therefore, the liquid crystal polyester fiber and fiber cloth (bonded textile) of the present embodiment are easily fiber formed, have fine fiber diameters, and further maintain excellent characteristics of the liquid polyester such as a low dielectric loss and high heat resistance, and can be applied to a variety of uses including electronic parts.

According to the material for fiber manufacturing with the configuration described above, the unevenness in the fiber strength can be reduced.

Further, according to the liquid crystal polyester fiber with the configuration described above, by using the material described above, a fiber with unevenness in the fiber strength suppressed is obtained.

EXAMPLES

While the present invention will be described through examples below, the present invention is not limited to such examples.

Melt Viscosity

The melt viscosity was measured for the obtained pellets with conditions of a nozzle pore diameter of 0.5 mm and a shear velocity of 1000 s$^{-1}$ using a flow feature testing machine (capirograph) 1B manufactured by Toyo Machine Mfg. Co., Ltd. with respect to each measurement temperature.

Flow Starting Temperature

The flow starting temperature of the liquid crystal polyester as the raw material of the material for fiber manufacturing was measured using a flow feature evaluation device "Flow Tester CPT-500 Type" manufactured by Shimadzu Corporation. The temperature at which the melt viscosity is 4800 Pa·s (48000 poise) when approximately 2 g of a sample was filled into a capillary type rheometer on which a die with an inner diameter of 1 mm and a length of 10 mm is attached and the liquid crystal polyester was extruded from a nozzle at a temperature rising speed of 4° C./minute under a load of 9.8 MPa (100 kgf/cm$^2$) was taken as the flow starting temperature.

Weight-Average Molecular Amount, Polydispersity

The weight-average molecular weight and the polydispersity of the liquid crystal polyester were calculated using values measured using the GPC-MALS method, through the method described above.

Measurement Conditions

GPC device: Gel permeation chromatograph GPC curve-MALS

MALS device: Multi-angle light scattering detector DAWN DSP (Wyatt Technology)

Wavelength: 633 nm

Column: Shodex K-G (1) (4.6 mmI.D.×10 cm)

: Shodex K-806M (2) (8.0 mmI.D.×30 cm)

: Shodex K-G (1) (4.6 mmI.D.×30 cm) (Showa Denko)

Solvent: Pentafluorophenol/chloroform (ratio by weight 35/65)

Flow speed: 0.787 ml/minute

Sample density: 0.04 mass %

Filtration: 0.20 μm-Millex-LH (Millipore)

Injection volume: 0.200 mL

Temperature: 23±2° C.

Solubility: Dissolved in a measurement solvent (measured by sight)

Detector: Differential refractive index detector (RI-8020, manufactured by Tosoh. Corporation)

Data processing: ASTRA (Wyatt Technology)

Synthesis of Prepolymer 911 g of (6.6 mol) of p-hydroxy benzoic acid, 409 g (2.2 mol) of 4,4'-dihydroxybiphenyl, 91 g (0.55 mol) of isophthalic acid, 274 g (1.65 mol) of terephthalic acid, and 1235 g (12.1 mol) of acetic anhydride were added and agitated in a reactor including an agitation device, a torque meter, a nitrogen gas inlet tube, a thermometer, and a reflux condenser.

Next, after adding 0.17 g of 1-methylimidazole as a catalyst and sufficiently substituting the inside of the reactor with nitrogen gas, the temperature was raised under a stream of nitrogen gas to 150° C. over 15 minutes, and the mixture was refluxed for 1 hour with the temperature maintained.

Next, after adding 1.7 g of 1-methylimidazole, the temperature was raised to 320° C. over 2 hours and 50 minutes while distilling the acetic acid byproduct which is distilled and the unreacted acetic anhydride. The point at which a rise in the torque can be seen was taken as the end of the reaction and the contents were extracted to obtain a prepolymer powder (particle diameter of approximately 0.1 mm to approximately 1 mm).

The flow starting temperature was 257° C.

Synthesis Example 1

After the temperature of the obtained prepolymer powder was raised from 25° C. to 250° C. over 1 hour, the temperature was raised from 250° C. to 270° C. over 2 hours and 23 minutes. By then solid-state polymerizing the prepolymer powder while maintaining the prepolymer powder at 270° C. for 5 hours before further cooling, Liquid Crystal Polyester (A)-1 in a powder form was obtained.

The flow starting temperature of Liquid Crystal Polyester (A)-1 was 315° C.

Furthermore, Liquid Crystal Polyester (A)-1-1 was obtained by screening Liquid Crystal Polyester (A)-1 so that the median diameter is equal to or greater than 250 μm and equal to or less than 600 μm.

When the weight-average molecular weight and the polydispersity of Liquid Crystal Polyester (A)-1-1 were measured, the weight-average molecular weight was 20800 and the polydispersity was 2.00.

Synthesis Example 2

After the temperature of the obtained prepolymer powder was raised from 25° C. to 250° C. over 1 hour, the temperature was raised from 250° C. to 275° C. over 2 hours and 58 minutes. By then solid-state polymerizing the prepolymer powder while maintaining the prepolymer powder at 275° C. for 5 hours before further cooling, Liquid Crystal Polyester (A)-2 in a powder form was obtained.

The flow starting temperature of Liquid Crystal Polyester (A)-2 was 320° C.

Furthermore, Liquid Crystal Polyester (A)-2-1 was obtained by screening Liquid Crystal Polyester (A)-2 so that the median diameter is equal to or greater than 250 μm and equal to or less than 600 μm.

When the weight-average molecular weight and the polydispersity of Liquid Crystal Polyester (A)-2-1 were measured, the weight-average molecular weight was 24200 and the polydispersity was 2.00.

Synthesis Example 3

After the temperature of the obtained prepolymer powder was raised from 25° C. to 250° C. over 1 hour, the temperature was raised from 250° C. to 280° C. over 3 hours and 34 minutes. By then solid-state polymerizing the prepolymer powder while maintaining the prepolymer powder at 275° C. for 5 hours further followed by cooling, Liquid Crystal Polyester (A)-3 in a powder form was obtained.

The flow starting temperature of Liquid Crystal Polyester (A)-3 was 330° C.

Furthermore, Liquid Crystal Polyester (A)-3-1 was obtained by screening Liquid Crystal Polyester (A)-3 so that the median diameter is equal to or greater than 250 μm and equal to or less than 600 μm.

When the weight-average molecular weight and the polydispersity a Liquid Crystal Polyester (A)-3-1 were measured, the weight-average molecular weight was 33900 and the polydispersity was 2.61.

Synthesis Example 4

When the weight-average molecular weight and the polydispersity were measured without screening Liquid Crystal Polyester (A)-2 of Synthesis Example 2 (particular diameter of approximately 0.1 mm to 4 mm), the weight-average molecular weight was 20100 and the polydispersity was 3.05.

Example 1

Liquid Crystal Polyester (A)-1-1 obtained in Synthesis Example I was melt kneaded using a biaxial extruder (PCM-30, manufactured by Ikegai Corp.) at a treatment temperature of 330° C. and granulation processed in a pellet form.

The melt viscosity measured for the obtained pellets with the conditions described above was 35 Pa·s at 350° C. Due to the knowledge of the present inventors, it is known that there is no difference in the melt viscosity of the liquid crystal polyester between a value measured for the liquid crystal polyester before melt kneading and a value measured for the pellets after melt kneading. Generally, since the greater the temperature of the liquid crystal polyester, the lower the melt viscosity, if the melt viscosity of Liquid Crystal Polyester (A)-1-1 is measured at 360° C., a melt viscosity value that is lower than the measurement result described above of 35 Pa·s is obtained. That is, it can be seen that the melt viscosity of Liquid Crystal Polyester (A)-1-1 measured at 360° C. is equal to or less than 70 Pa·s.

Next, after passing a material melted using the multifilament spinning device "Polymer Mate V" manufactured by Chubu Chemical Machine Works, Inc., Ltd. through a filter (made of stainless steel), the material was discharged from a nozzle and melt spun at 350° C. A nozzle with a pore diameter of 0.3 mm and 24 pores was used, and the material was wound at a discharge rate of 25 g/minute and a spinning speed of 400 m/minute.

The liquid crystal polyester fiber was wound on a metal bobbin and heated for 12 hours at 320° C. The tensile strength of each heated thread thus obtained (average value of 5 test pieces) was measured.

Example 2

Liquid Crystal Polyester (A)-2-1 was made into pellets in a similar manner to Example 1.

The melt viscosity measured for the obtained pellets with the conditions described above was 35 Pa·s at 350° C. Generally, since the greater the temperature of the liquid crystal polyester, the lower the melt viscosity, if the melt viscosity of Liquid Crystal Polyester (A)-2-1 is measured at 360° C., a melt viscosity value that is lower than the measurement result described above of 35 Pa·s is obtained. That is, it can be seen that the melt viscosity of Liquid Crystal Polyester (A)-2-1 measured at 360° C. is equal to or less than 70 Pa·s.

Spinning was performed using the obtained pellets in a similar manner to Example 1, and the tensile strength of the heated thread was measured.

Comparative Example 1

Liquid Crystal Polyester (A)-3-1 was made into pellets in a similar manner to Example 1.

The melt viscosity measured for the obtained pellets with the conditions described above was 35 Pa·s at 350° C. Generally, since the greater the temperature of the liquid crystal polyester, the lower the melt viscosity, if the melt viscosity of Liquid Crystal Polyester (A)-3-1 is measured at 360° C., a melt viscosity value that is lower than the measurement result described above of 35 Pa·s is obtained. That is, it can be seen that the melt viscosity of Liquid Crystal Polyester (A)-3-1 measured at 360° C. is equal to or less than 70 Pa·s.

Spinning was performed using the obtained pellets in a similar manner to Example 1, and the tensile strength of the heated thread was measured.

Comparative Example 2

Liquid Crystal Polyester (A)-2 was made into pellets in a similar manner to Example 1.

The melt viscosity measured for the obtained pellets with the conditions described above was 35 Pa·s at 350° C. Generally, since the greater the temperature of the liquid crystal polyester, the lower the melt viscosity, if the melt viscosity of Liquid Crystal Polyester (A)-2 is measured at 360° C., a melt viscosity value that is lower than the measurement result described above of 35 Pa·s is obtained. That is, it can be seen that the melt viscosity of Liquid Crystal Polyester (A)-2 measured at 360° C. is equal to or less than 70 Pa·s.

Spinning was performed using the obtained pellets in a similar manner to Example 1, and the tensile strength of the heated thread was measured.

The measurement results of the tensile strength are shown in the following Table 1 for the examples and comparative examples.

TABLE 1

| | Weight-average molecular weight | Polydispersity | Tensile strength (cN/dtex), (n = 5 average value) |
|---|---|---|---|
| Example 1 | 20800 | 2.00 | 30.5 |
| Example 2 | 24200 | 2.00 | 30.0 |
| Comparative Example 1 | 33900 | 2.61 | 28.0 |
| Comparative Example 2 | 20100 | 3.05 | 28.2 |

First, as a result of the evaluation, for all of the examples and comparative examples, spinning was performed stably for one hour from the start of the discharge of the liquid crystal polyester fiber without the thread of the liquid crystal polyester fiber being broken.

Further, the tensile strength of the fibers obtained in Examples 1 and 2 were of greater strength than the tensile strength of the fibers obtained in Comparative Examples 1 and 2.

From such results, the utility of the present invention was confirmed.

Since the liquid crystal polyester of the present invention can be spun stably without being broken and has even strength, the liquid crystal polyester fiber can be favorably used in electronic parts, for example, or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A material for fiber manufacturing comprising a liquid crystal polyester satisfying the following requirements (a) and (b):
   (a) a weight-average molecular weight is equal to or less than 28000 and a polydispersity is equal to or less than 2.5; and (b) a melt viscosity measured at 360° C. with conditions of a nozzle pore diameter of 0.5 mm and a shear velocity of 1000 s$^{-1}$ using a flow feature testing machine is equal to or less than 70 Pa·s.

2. The material for fiber manufacturing according to claim 1, wherein the liquid crystal polyester comprises repeating units represented by the following Formulae (1), (2), and (3):

$$—O—Ar^1—CO— \quad (1)$$

$$—CO—Ar^2—CO— \text{ and} \quad (2)$$

$$—X—Ar^3—Y— \quad (3)$$

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by the following Formula (4); X and Y each independently represent an oxygen atom or an imino group (—NH—); and hydrogen atoms in the group represented by $Ar^1$, $Ar^2$, or $Ar^3$ may each be independently substituted by a halogen atom, an alkyl group with 1 to 10 carbon atoms, or an aryl group with 6 to 20 carbon atoms;

$$—Ar^4—Z—Ar^5 \quad (4)$$

wherein $Ar^4$ and $Ar^5$ each independently represent a phenylene group or a naphthylene group and Z represents an oxygen atom, a sulfur atom, a carbonyl group, a sulfonyl group, or an alkylidene group.

3. The material for fiber manufacturing according to claim 2, wherein the liquid crystal polyester comprises a repeating unit represented by Formula (1) in which $Ar^1$ is a 1,4-phenylene group, a repeating unit represented by Formula (2) in which $Ar^2$ is a 1,4-phenylene group or a 1,3-phenylene group, and a repeating unit represented by Formula (3) in which $Ar^3$ is a 4,4'-biphenylylene group.

4. The material for fiber manufacturing according to claim 2, wherein the liquid crystal polyester has a content amount of a repeating unit comprising a 2,6-naphthylene group of equal to or greater than 40 mol % with respect to a total content amount of all repeating units.

5. A fiber manufactured by spinning the material according to claim 1.

6. The material for fiber manufacturing according to claim 3, wherein the liquid crystal polyester has a content amount of a repeating unit comprising a 2,6-naphthylene group of equal to or greater than 40 mol % with respect to a total content amount of all repeating units.

7. A fiber manufactured by spinning the material according to claim 2.

8. A fiber manufactured by spinning the material according to claim 3.

9. A fiber manufactured by spinning the material according to claim 4.

* * * * *